March 4, 1947.  G. K. TEAL  2,416,720

ELECTRO-OPTICAL DEVICE

Filed Jan. 30, 1943

INVENTOR
G. K. TEAL
BY
ATTORNEY

Patented Mar. 4, 1947

2,416,720

UNITED STATES PATENT OFFICE 2,416,720

ELECTROOPTICAL DEVICE

Gordon K. Teal, Summit, N. J., assignor to Bell Telephone Laboratories, Incorporated, New York, N. Y., a corporation of New York Application January 30, 1943, Serial No. 474,206

10 Claims. (Cl. 250—167)

This invention relates to electro-optical devices and more specifically to photo-E. M. F. devices for controlling electron beams and to methods of making them.

A photo-E. M. F. device may be defined as a material, combination of materials, or cell which when electromagnetic radiations of certain short wave-length, like those, for example, to which the eye is sensitive, are applied thereto, will produce an electromotive force across its terminals, or across two portions thereof which can serve as terminals. In the present invention, in one of its primary aspects, the voltage set up between the terminals of a photo-E. M. F. device or cell when such waves are applied thereto is used to control an electron beam. In describing the invention, such waves will be called light, but this term is used in a broad sense to be inclusive of radiations to which the eye is not sensitive.

It is an object of the present invention to provide an electro-optical arrangement wherein electrons of a low velocity primary beam are controlled by the voltage appearing across the terminals of a photo-E. M. F. device in response to light radiations applied thereto.

It is another object to provide an electro-optical device making use of an apertured photo-E. M. F. target for controlling low velocity primary electrons.

It is another object of this invention to provide an apertured photo-E. M. F. target for low velocity electrons and methods of making it.

In accordance with the invention there is provided an electro-optical device wherein a low velocity cathode ray beam therein is controlled by means of potentials generated across elemental photo-E. M. F. elements in a target structure subjected to applied light radiations.

In accordance with a preferred embodiment, chosen by way of example to illustrate the principles of novelty of the present invention, a television electron camera tube is provided which comprises an evacuated envelope enclosing means for generating a stream of electrons, means both within and without said envelope for focusing said stream into a low velocity beam of electrons, a target for said low velocity beam comprising an apertured metal screen or plate carrying on the side remote from the beam generating means a multiplicity of elemental photo-E. M. F. cells, each cell surrounding and being partially within one of the apertures therein. An image of an object is projected upon the photo-E. M. F. cells and the other side of the target is scanned with the beam of low velocity electrons.

The principle of operation of this tube is as follows: The beam generating means produces a relatively low velocity beam, that is, a beam which has almost zero velocity at the target. This beam is caused to scan the side of the target remote from the photo-E. M. F. cells. These cells have applied thereto light radiations from the object to be televised. There is produced across each cell a voltage proportional to the light striking the cell from the corresponding elemental area of the object. The low velocity scanning beam, or a portion thereof, passes through each aperture in turn and has its intensity varied by the potential of the elemental photo-E. M. F. cell surrounding and partially within the aperture. The electrons which pass through the apertures are collected by a collecting electrode located within the tube between the target and the object. The collector electrode is connected to a signal resistor which in turn is connected to a suitable video signal amplifier.

While the invention in its principal aspects relates to electron camera tubes for television or to novel photo-E. M. F. targets, it will be appreciated that the invention is not limited to this as the principle of controlling the flow of low velocity primary electrons through an apertured member in response to a voltage produced by a photo-E. M. F. cell may have other uses, as in light controlled devices for switching, for example.

The invention will be more readily understood by referring to the following description taken in connection with the accompanying drawing forming a part thereof in which.

Figure 1:
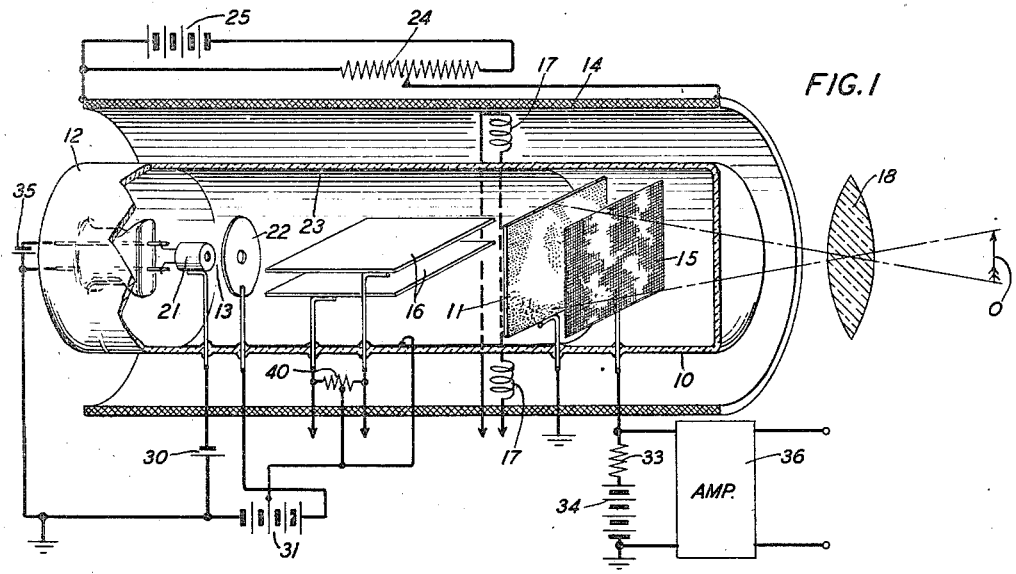
Fig. 1 is a schematic representation of a cathode ray tube of this invention and certain of its associated circuits.

Referring more particularly to the drawing, Fig. 1 shows, by way of example to illustrate the principles of this invention, a cathode ray transmitter tube 10 employing a two-sided mosaic 11 containing photo-E. M. F. elements. The tube 10 comprises an evacuated container 12 enclosing a mosaic target 11, an electron gun 13 for generating and, in cooperation with a magnetic focusing coil 14, for focusing a beam of low velocity electrons towards this target, an electron collecting electrode 15 on the side of the target 11 remote from the electron gun 13 and two sets of deflecting elements comprising the deflecting plates 16 and the magnetic coils 17 for causing the beam of electrons to scan every elemental area in turn of a field of view on the mosaic target 11. Radiations from an object or field of view O are applied to the side of the mosaic target 11 remote from the electron gun by means of any suitable optical system represented schematically by the lens 18.

The electron gun 13 preferably comprises a cathode (not shown), a control electrode member 21 surrounding the cathode, a first anode member 22, and a second and final anode member comprising a coating 23 of conducting material on the inside walls of the envelope 12 extending from the region of the cathode to the region of the mosaic target 11. The focusing coil 14 which receives current from a potentiometer resistor 24 connected across a source of direct potential 25 assists in the focusing of the electron beam in a manner well known to the workers in the art. The collecting electrode 15 may consist of mesh material or it may be a ring of metallic material.

The control electrode 21 is placed at any suitable negative potential with respect to the cathode by means of an adjustable source 30 and the first anode 22 is placed at appropriate positive potential, of, for example, about 250 volts, with respect to the cathode by means of the source 31. The conducting coating 23 is preferably placed at a positive potential of about 50 to 100 volts with respect to the cathode by means of a portion of the source 31. The collecting electrode 15 is preferably connected to ground through a signal resistor 33 and a source 34 which is so poled that the electrode 15 is at a positive potential of, for example, from 50 to 100 volts with respect to ground. A suitable source 35 is utilized to heat the cathode. Any suitable amplifier 36 is connected in circuit with the signal resistor 33. The potentials applied to the various electrode members and the configuration and spacing thereof are such that, in cooperation with the current through the focusing coil 14, a beam of low velocity focused electrons strikes the target 11 and this beam is deflected over a suitable field thereon by means of appropriate potentials applied to the deflecting plates 16 and appropriate currents passed through the coils 17 by means of suitable sweep circuits (not shown). A high resistance 40 is preferably connected between the plates 16 which, as in the well-known "Orthicon," are made as wide as the target 11. The mid-point of this high resistance element is connected to the conducting coating 23. This makes the potentials of the deflecting plates balanced at all times with respect to the potential of the coating 23. The deflecting coils 17 which are shown schematically in the drawing, can be of any suitable form; for example, they can be of the type of magnetic coils disclosed in Patent 2,278,478, issued April 7, 1942, to B. M. Oliver. For an example of a suitable electrostatic sweep circuit, reference is made to Patent 2,178,464, dated October 31, 1939, to M. W. Baldwin, Jr., which discloses suitable balanced sweep circuits for the electrostatic deflecting plates 16. Any magnetic sweep circuit known to the workers in the art can be applied to the coils 17 such as, for example, one of those disclosed in Patent 2,315,073 of F. R. Norton, issued March 30, 1943.

Figure 2:
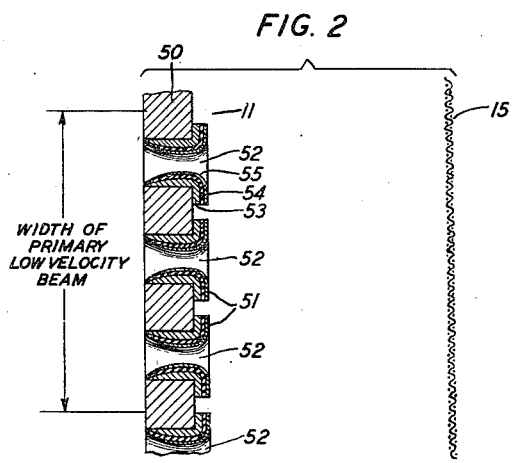
Fig. 2 is a schematic view showing, in greatly enlarged form, a portion of the target and of the electron collecting eelctrode of the tube shown in Fig. 1.
Figure 3:
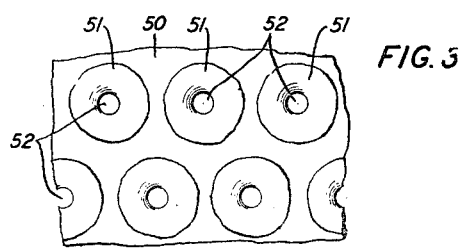
Fig. 3 is an enlarged front view of a portion of the target.

Reference will now be made to Figs. 2 and 3 which show enlarged portions of a preferred form of mosaic target 11. Fig. 2 is a greatly enlarged schematic view of a portion of the target 11, while Fig. 3 is an enlarged schematic view taken from the right in Fig. 2. Certain dimensions in Figs. 2 and 3 have been exaggerated at the expense of others in order to more clearly show the different screen layers, which are necessarily thin. The mosaic target 11 preferably comprises an apertured plate 50 of any suitable material, such as nickel, carrying thereon on the side remote from the beam generating means a multiplicity of photo-E. M. F. cells 51 each surrounding and partially filling an aperture 52 in the plate 50. The plate 50 is preferably placed at ground or other suitable fixed potential. Each of the elements 51 may comprise, by way of example, a small copper oxide photo-E. M. F. cell, one form of which, as is well known in the art, comprises a layer of copper, a layer of cuprous oxide thereon which is treated by means well known in the art to produce a blocking layer, and a suitable conducting element, such as silver, covering the blocking layer.

A satisfactory method of making the mosaic screen is as follows: A screen 50 of perforated nickel foil, having, for example, 100 to 200 perforations per inch and made by any standard commercial process, is dipped in a dilute solution of waxy or greasy material in benzene, carbon tetrachloride, or other solvent to give a thin film of wax or grease on the screen. The screen is then drawn over a gelatin roller heavily inked with etching (acid resisting) ink so as to force ink through the holes of the screen and over a small area around each hole on the side away from the roller. The spreading of the ink can be assisted by a slight warming of the screen in benzene vapor. The part of the screen not covered by etching ink is then plated with a film or mask of silver or other metal which (because of the thin greasy or waxy film) can be stripped away later. The etching ink and waxy film under it are then removed by dissolving them in benzene. A copper film 53 is then deposited on the plated side of the screen 50 by evaporation. The copper is oxidized by any suitable means and the oxide surface 54 thus formed is treated by electron or ion bombardment to produce a blocking layer for each small cell 51. A very thin semitransparent film 55 of gold or other suitable conducting material is evaporated onto the small cell surfaces and the silver mask and the films on it are stripped away, leaving small photo-E. M. F. cells 51 surrounding and partially filling each of the apertures 52 in the plate 59. These cells are of the type known as a "front wall" cell. In each of these cells a negative potential with respect to the plate 50 is acquired by the semitransparent metal layer 55 when light radiations are applied to the cells from the object O. If desired, the cells can be produced by any suitable process which produces a "back wall" type of cell but cells of this latter type are generally not as sensitive as those of the "front wall" type. If the cells 51 are of the "back wall" type, the semitransparent layer 55 becomes positive with respect to the plate 50 when light radiations are applied thereto. The arrangement in accordance with this invention is operable with either type of cell and, moreover, is not limited to the use of either the copper oxide type or the silicon-silicon oxide type now to be described.

As an alternative, the cells 51 can be of the silicon-silicon oxide type. These cells can be made as follows: First, silicon (instead of copper) is deposited on the silver-plated side of the screen 50 after the etching ink has been removed. A more to be preferred method is to deposit the "silicon" in two layers, one by simultaneous evaporation of silicon and a more conducting element, such as aluminum, arsenic, titanium, copper or silver, and the second by evaporation of silicon alone. The effect of the more conducting element is to give the cell a lower internal impedance than would otherwise be obtained. Because of the low impedance, electrons which fall back on the surface of the target remote from the beam do not charge this surface. This is followed by simultaneous evaporation of a conducting element, such as tungsten, silicon, molybdenum or tantalum, with an insulator, such as quartz, or by forming alternate films or layers of the conductor and insulator. The layers are made very thin and as they are not very smooth, each one partially merges with an adjacent one or ones. Finally, a thin semitransparent film of gold or other suitable metal is evaporated on the surface and the silver mask is stripped from the screen.

Another method of forming a mosaic screen of the silicon-silicon oxide type is to evaporate silicon or to deposit silicon upon a perforated metal screen by heating simultaneously silicon tetrachloride and hydrogen gases or by heating silicon hydride gas. The impedance of the deposited layer can be kept low by simultaneous deposition of a metal which is more conducting than silicon, such as arsenic, titanium, copper, silver or aluminum, from its chloride vapor or from its hydride. A second and very thin layer is formed on one side of the screen by evaporating silicon on this first layer. This is followed by evaporation on the thin film of alternate thin layers of tungsten or other suitable metal and an insulator, such as quartz, or by simultaneously evaporating the metal and the insulator. Finally, a very thin, discontinuous, semitransparent, laterally non-conducting film of gold or other suitable metal is applied. Each of the above-mentioned films or layers is deposited in such manner and concentration that the conduction through each film or layer is large compared to the conduction laterally thereof.

The operation of the arrangement shown in Fig. 1 is as follows, reference also being made to Figs. 2 and 3: Radiations from an object or field of view O are projected upon the right-hand side of the mosaic target 11 by means of the lens system 18. The low velocity beam of electrons, generated by the electron gun 13 and focused by this gun with the assistance of the magnetic focusing member 14, approaches the target 11. As shown in Fig. 2, the cathode ray beam is generally of such size that it covers several apertures and the spaces between them. This beam has practically no velocity at the mosaic target 11 due to the fact that the member 50 is at cathode potential. Some of these low velocity primary electrons pass through the apertures 52 and are attracted to the electrode 15. As the collector electrode 23 is positive, for example, by about 50 to 100 volts with respect to the potential of the plate 50, electrons not pulled through will be pulled back toward the collector electrode 23. The number of electrons which pass through any particular aperture 52 is dependent upon the potentials generated across the individual photo-E. M. F. cells 51 by the radiations applied thereto from the corresponding elemental areas of the object. This potential between the metal member 55 and the metal screen member 50 varies the number of electrons which pass through the corresponding aperture 52 and are collected by the electrode 15 which is positive by, for example, 50 to 100 volts with respect to the member 50. The action of the photo-E. M. F. cells 51 is somewhat analogous to that of a grid in a triode. Any secondary or primary electrons which do not go through the apertures 52 and are picked up by the plate 50 do not introduce distortion in the signal current as the plate 50 is maintained at a fixed potential. If any electrons fall back on the side of the cells 51 remote from the electron beam source, they are immediately conducted to the plate 50 as the resistance of the cells is relatively low. Unlike the storage type of electron camera tube using photoemissive elements wherein each photoemissive element must be discharged one per cycle, the photo-E. M. F. cells 51 can have the potential thereacross varied at will (by the change in light) and need not have this potential brought to zero once every scanning cycle. The variable current passing through the resistor 33 connected to the electrode 15 constitutes the video signal current and this current is amplified by the amplifier 36 in a manner well known in the art. The video current is then caused to modulate a carrier for transmission to a distant station by means well known.

Various modifications may be made in the embodiments described above without departing from the spirit of the invention, the scope of which is indicated by the appended claims.

What is claimed is:

1. A target member for electrons comprising a metallic member having a multiplicity of apertures, and a photo-E. M. F. cell surrounding each aperture at one end thereof and also extending into the apertures along the walls thereof.

2. A target member for electrons comprising a metallic member having a multiplicity of apertures, and a photo-E. M. F. cell surrounding each aperture at one end thereof and also extending into the apertures along the walls thereof, each of said photo-E. M. F. cells comprising silicon and an oxide of silicon.

3. A target member for electrons comprising a metallic member having a multiplicity of apertures, and a photo-E. M. F. cell surrounding each aperture at one end thereof and also extending into the apertures along the walls thereof, each of said photo-E. M. F. cells comprising a mixed layer of silicon and a more conducting element than silicon and a layer of an oxide of silicon.

4. A method of making a mosaic target which comprises coating the space in and around the apertures of an apertured metallic member with a substance which cannot be plated with a certain metal, plating the uncoated portion of one side of said apertured member with said certain metal, dissolving said coating with a solvent, and forming photo-E. M. F. cells on that portion of said apertured member which had been covered by said coating.

5. A method of making a mosaic target which comprises forming a thin film of wax or grease on both sides and in the apertures of a screen of perforated metal, coating the space in and around the apertures of said screen and all of one side thereof with a substance which cannot be plated with a certain material, leaving portions of the screen on the side opposite the coated side uncoated, plating the uncoated portion of said screen with said certain material, dissolving the said substance and the waxy or greasy layer under it with a solvent, forming light-sensitive elements on those portions of said apertured member which were originally covered by said substance, and stripping said plating of said material from said screen.

6. A generally ring-shaped photo-E. M. F. cell having a portion one face of which extends generally perpendicular to its axis, said face being adapted to receive radiations to energize the cell, and another portion surrounding said axis and extending therealong in a direction away from said first portion, a source of electrons external to said cell, and means adjacent said cell and in a path passing through the opening thereof for directing electrons from said source so that they traverse the opening in said cell in the general direction of the axis thereof.

7. An electron space current device for converting light variations into electrical variations comprising an enclosing envelope having therein a mosaic electron target comprising an apertured conducting member carrying a multiplicity of discrete photo-E. M. F. cells in conductive relation thereto, each cell surrounding an aperture at one end thereof and also extending into the aperture along the walls thereof, a wall of said envelope being light conducting to permit light to be impressed on said cells from without the envelope to energize the cells to set up voltages thereacross dependent upon the intensity of the light incident thereon, and electrode means in said envelope for generating electrons of such low velocity that their flow can be controlled by voltages of the order of magnitude of those produced by said cells, and means adjacent said envelope for setting up a force within a space adjacent to said apertures for directing some of said low velocity electrons toward each of said apertures in turn, whereby the number of said low velocity electrons which can pass through each of said apertures is dependent on the voltage set up across the photo-E. M. F. cell adjacent to said aperture.

8. The combination of elements of claim 7 in which each of said cells comprises silicon and an oxide of silicon.

9. The combination of elements of claim 7 in which said means for generating low velocity electrons comprises an electron gun system which produces a beam having substantially zero velocity at the apertured member.

10. The combination of elements of claim 7 in further combination with a collecting electrode adjacent said target on the side thereof remote from said electrode means adapted to be placed at a positive potential with respect to said apertured member.

GORDON K. TEAL.

REFERENCES CITED

The following references are of record in the file of this patent:

UNITED STATES PATENTS

| Number | Name | Date |
| --- | --- | --- |
| 2,120,765 | Orvin | June 14, 1938 |
| 2,045,984 | Flory | June 30, 1936 |
| 2,338,234 | Dimmick | Jan. 4, 1944 |
| 2,264,152 | Rowland | Nov. 25, 1941 |
| 817,608 | Adames | Apr. 10, 1906 |
| 2,141,375 | Castro | Dec. 27, 1938 |
| 2,163,266 | Bartels | June 20, 1939 |
| 2,373,395 | Hefele | Apr. 10, 1945 |